United States Patent Office 2,922,480
Patented Jan. 26, 1960

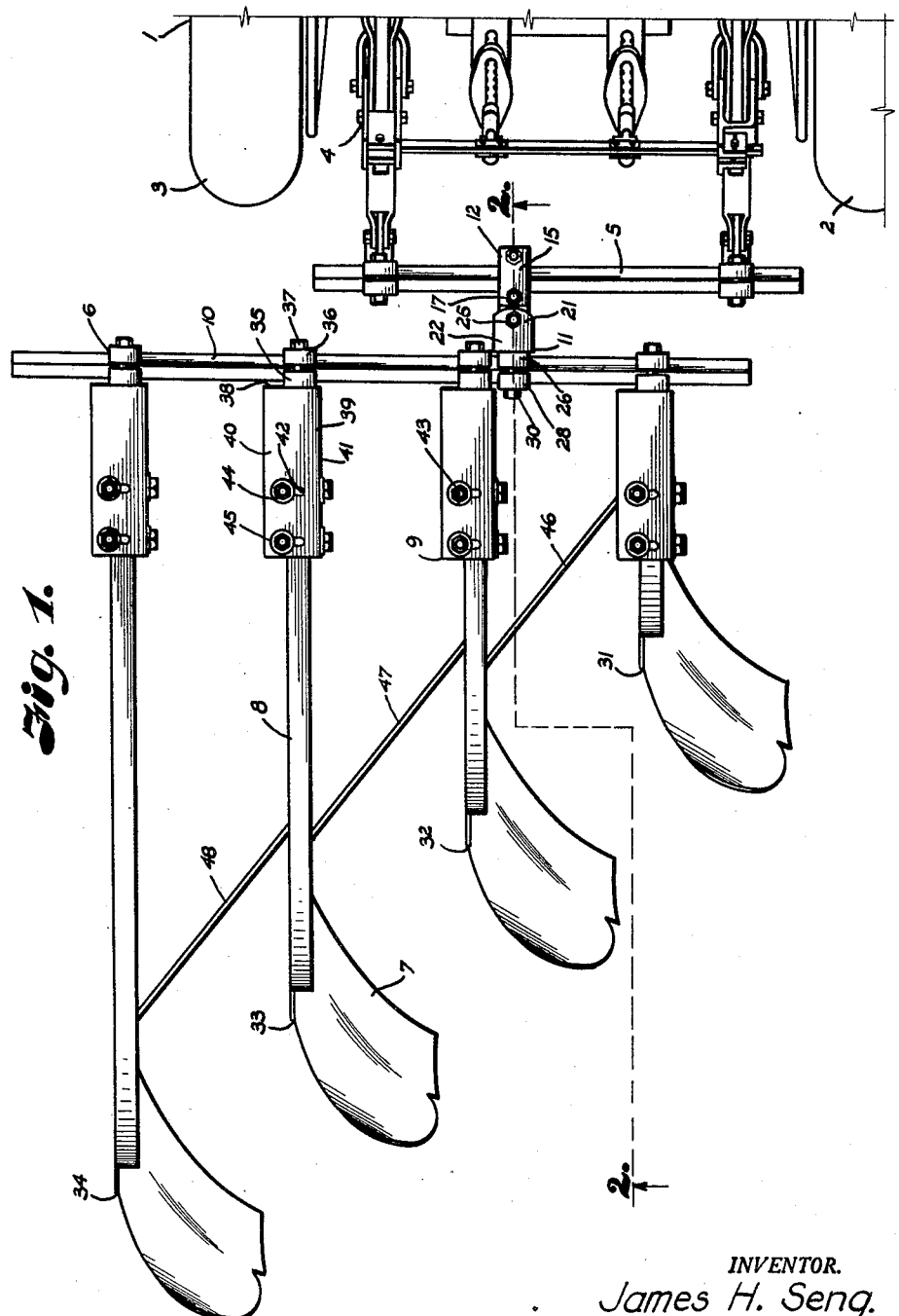

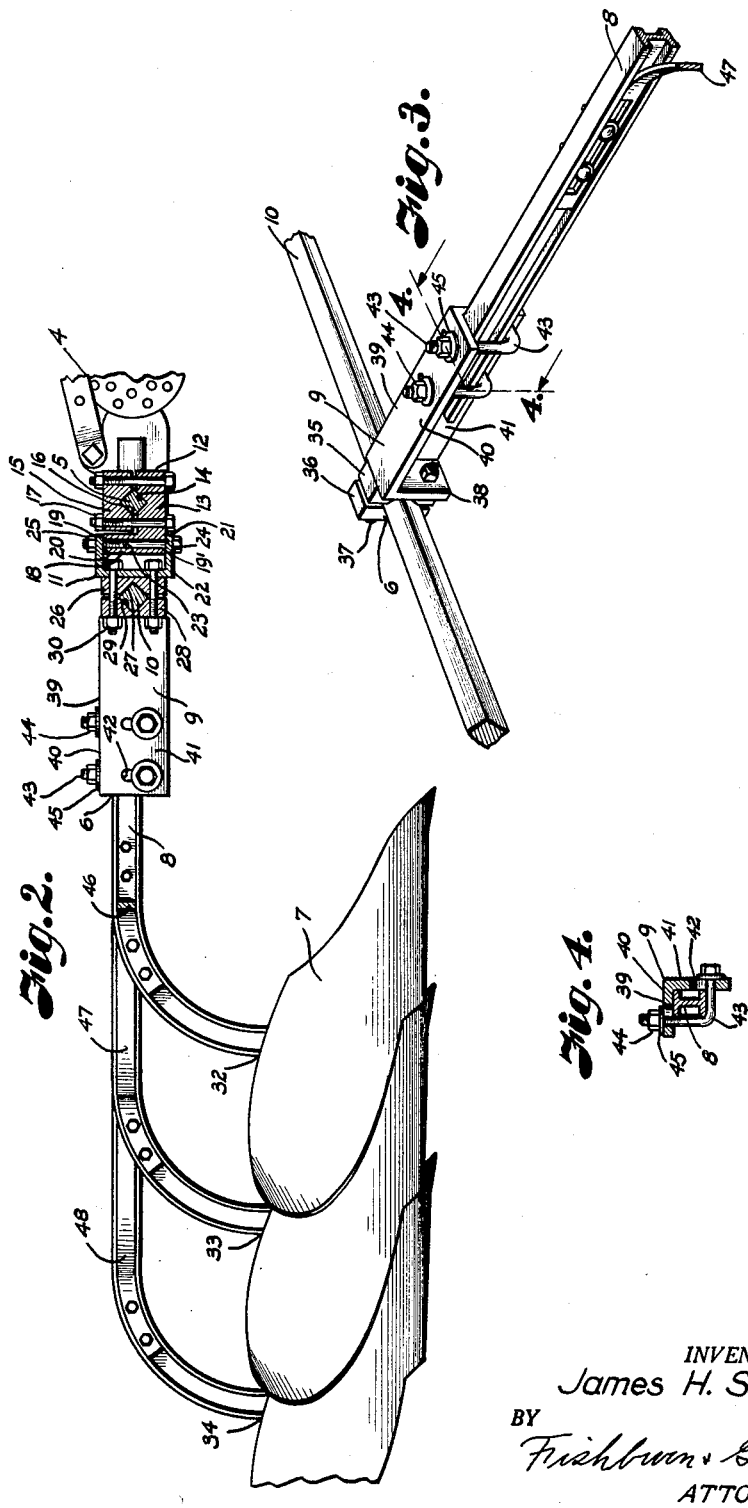

2,922,480

ADJUSTABLE DEVICE FOR MOUNTING FOR AGRICULTURAL IMPLEMENTS

James H. Seng, Salina, Kans.

Application November 14, 1955, Serial No. 546,540

2 Claims. (Cl. 172—656)

This invention relates to a novel connection of an agricultural implement to a tractor for towing of the implement, and more particularly to an improved adjustable mechanism for mounting and connecting plow shares of a gang for equalization of forces that act on the plow shares and tend to produce a side draft or drag thereto.

It is quite common in tilling of the soil to arrange a plurality of plow shares in a gang behind a tractor and make a connection therebetween whereby the plows are towed behind the tractor. One rear wheel of the tractor is usually operated in the last furrow plowed and the plow shares behind the tractor are suitably spaced with the leading plow share adjacent the wheel in said last furrow so as to turn the dirt from the furrow being plowed by the leading plow share into said last furrow. Each of the other plow shares behind a tractor are spaced to turn the dirt from the furrow being plowed thereby into the furrow plowed by the next adjacent leading plow share. Due to this arrangement, the lateral spacing of the plow shares and the positioning of the leading plow share relative to the rear tractor wheel operating in the last furrow plowed is subject to little variation. A gang of plow shares may be arranged and connected to a tractor of a certain rear wheel spacing in a manner that with all conditions remaining the same the plows would trail behind the tractor with little side draft. However, change of tractor wheel spacing, depth of plowing, soil condition and other conditions alter the forces acting on the plow shares causing an unbalanced force condition or forces that tend to move the plows laterally or pull the tractor sideways and also creating greater resistance to movement through the ground whereby more power is required for the plowing.

The objects of the present invention are to provide, a plow mounting and connection to a tractor for suitable adjustment laterally and longitudinally of the position of the plow shares according to tractor wheel spacing for eliminating side draft and causing the plow shares to trail in a straight line behind the tractor; to provide an adjustable plow connection whereby the leverage exerted by the particular plow share relative to the hitch is increased or decreased without change in the lateral spacing of the plows in the plow gang; and to provide an adjustable plow share connection that is economical to manufacture, easily attached to a suitable draw bar or tool bar and adjusted for efficient plowing with substantially no side draft.

In accomplishing these and other objects of the present invention, I have provided improved details of structure, the preferred form of which is shown in the accompanying drawings, wherein:

Fig. 1 is a plan view of a gang of plows showing the mounting and connection thereof to a tractor.

Fig. 2 is a transverse sectional view through the plow structure on the line 2—2, Fig. 1.

Fig. 3 is a partial perspective view showing the plow beam connection to a tool bar.

Fig. 4 is a transverse sectional view through the plow beam connector on the line 4—4, Fig. 3.

Referring more in detail to the drawings:

1 designates a tractor having rear wheels 2 and 3 and a suitable lift mechanism 4 carrying a draft or draw bar 5 for controlled vertical swinging movement and side to side inclination thereof. The lift mechanism 4 illustrated is generally the structure disclosed in my prior Patent No. 2,658,438 issued November 10, 1953, on "Tractor Mounting for Agricultural Implements," but may be of any conventional lift structure capable of carrying a draw bar or like beam 5 in a manner wherein it serves as a draw bar to which an agricultural implement 6 is connected. The agricultural implement 6 is a gang plow arrangement having a plurality of plow shares 7, each of which have plow beams 8 extending upwardly and forwardly from the respective plow shares 7, the plow beams 8 being arranged in laterally spaced relation and each adjustably connected by means of a connecting member 9 to a draw bar or like beam 10 which is suitably connected by a hitch member 11 to the draw bar or like beam 5.

In the illustrated structure, the hitch 11 includes a clamp formation 12 wherein a bottom member 13 has a V-shaped notch 14 extending transversely thereof for receiving one edge of the draw bar 5. A clamp cap 15 is disposed at the opposite side of the draw bar and has a transverse V-shaped notch 16 for receiving the opposite edge of the draw bar. The cap 15 is secured to the bottom member 13 by a plurality of fastening devices such as bolts 17 disposed at opposite sides of the draw bar to firmly secure the bottom member and cap 15 to the draw bar 5 in desired poistion relative to the wheels 2 and 3 of the tractor.

The clamp formation 12 may be secured to the tool bar 10 to make a rigid connection between the tool bar 10 and draw bar 5 if desired. Also the tool bar 10 may be connected directly to the lift structure in the same manner as the connection of the draw bar 5. However, in the illustrated structure, the hitch is arranged for pivotal mounting of the tool bar 10 relative to the draw bar 5 whereby the tool bar 10 may swing about a substantially vertical axis. In the illustrated structure, the bottom member 13 has a rearward extension 18 provided with upper and lower faces 19 and 19' respectively adapted to be engaged by inner faces 20 of ears 21 of a yoke 22, the extension 18 and ears 21 having aligned bores 23 and 24 respectively in which is arranged a pivot pin 25.

The yoke 22 has a bar member 26 provided with a V-shaped notch 27 adapted to receive one edge of a tool bar 10. A cap 28 has a V notch 29 for receiving the opposite edge of the tool bar 10, said cap 28 being secured to the bar 26 of the yoke by means of a plurality of suitable fastening devices such as bolts 30 disposed on opposite sides of the tool bar for firmly securing the yoke to the tool bar 10 in desired position relative to the plow shares as later described. With the hitch arrangement as described, the tool bar 10 extends substantially transversely of the tractor in trailing relation thereto.

In the illustrated structure, each of the plow shares 7 is a right hand plow, and the leading plow 31 of the plow gang has its beam connected to the tool bar 10 in suitable lateral spacing from the right hand tractor wheel 2 whereby said tractor wheel may operate in the furrow last plowed and the plow share 7 of the leading plow 31 will form a furrow and turn the dirt therefrom into said last furrow plowed, the spacing of the plow share of the plow 31 from the last furrow plowed being a standard spacing for the particular size plow share being used. Each of the other plows of the gang to the left of and in order from the plow 31 have the same relative lateral spacing from each other. In other words, the plow 32 is arranged to plow a furrow wherein the dirt therefrom will be turned into the furrow produced by the plow 31, the plow 33 will provide a furrow wherein the dirt therefrom will be turned into the furrow produced by the plow 32, and the plow 34 will produce a furrow and turn the dirt into the furrow produced by the plow 33.

The plow beam connectors 9 each include a clamp member 35 having a V-shaped groove adapted to receive one side of the tool bar 10 and a cap member 36 adapted to be arranged on the opposite side of the tool bar and secured to the clamp member 35 by suitable fastening devices such as bolts 37 to firmly secure the clamp member 35 to the tool bar. The bolts 37 also secure an end plate 38 to the clamp member 35. A connector bracket 39 is fixed to and extends rearwardly from the plate 38, said bracket preferably being angular in cross section and arranged to have a substantially horizontal flange 40 and a vertical flange 41 whereby the upper surface of the respective plow beam 8 engages the bottom surface of the flange 40 and one side of the plow beam engages the inner surface of the vertical flange 41 of the bracket 39. The flanges 40 and 41 each have a plurality of preferably aligned slotted openings 42 for receiving L-shaped bolts 43 wherein one leg of the bolts will extend through the slots 42 in the flange 40 and the other leg will extend through a co-planar slot in the flange 41, the ends of the legs of the L-shaped bolts 43 preferably being threaded and nuts 44 and washers 45 arranged thereon whereby threading the nuts on the legs of the L-shaped bolts draws said legs into engagement with the respective plow beam 8 to firmly clamp the plow beam to the bracket 39. The bracket 39 is of elongated structure, and the bolts 43 so positioned as to provide substantial longitudinal adjustment of the plow beam 8 relative to the bracket 39.

Diagonal braces 46, 47 and 48 are arranged between the beams of the respective plows and the ends of said braces are suitably secured to the plow beams to maintain the plow beams in spaced apart and substantially parallel relationship to each other. While the plows illustrated and described are right hand plows, it is to be understood left hand plows may be used with a reversal of arrangement of the connections to the tool bar 10.

In connecting a gang of plows constructed and arranged as described to a tractor, the hitch 11 is arranged in approximately the desired position and secured to the draw bars 5 and 10 whereby the tool bar 10 is approximately in the desired trailing position for the gang of plows. Then the connectors 9 are each arranged on the tool bar 10 and secured thereby by the clamp structures in the desired positions having suitable lateral spacing one to the other with a connector adjacent the rear wheel 2 of the tractor properly spaced therefrom whereby the plow connected thereto will be properly spaced from the last furrow plowed. The connectors 9 are then firmly secured to the tool bar by the clamp structure therefor and then the L-shaped bolts 43 are loosened and the beams 8 of the respective plows are inserted between the L-shaped bolts 43 and the flanges of the bracket 39. It is necessary that the plow beam of the plow 31 be the shorter and that the next succeeding plows to the left thereof have progressively longer beams whereby the plows are spaced laterally and longitudinally of the path as illustrated in Fig. 1. When the respective plows are arranged in the usual lateral and longitudinal spacing, the nuts 44 on the bolts 43 are tightened to clamp the plow beams to the connectors 9. The braces 46, 47 and 48 are then connected to the plow beams and the structure is then assembled and ready for plowing operations with the desired lateral spacing of the plows. The tractor is then operated and the lift structure 44 actuated to lower the tool bar 5 and the gang plow structure whereby the plow shares 7 will enter into the ground. The forward pull for each plow as arranged in Fig. 1 is such that the forward pull on the plows 32, 33 and 34 each provide a moment tending to swing the tool bar 10 in a counter clockwise direction. The lateral or side thrust on each of the plow shares 7 tends to create respective moments that tend to swing the tool bar 10 in a clockwise direction, Fig. 1.

Moving the hitch 11 laterally the same amount and in the same direction on both the draw bar 5 and tool bar 10, changes the respective moments of force. It has been found that even very close adjustments of the hitch will not eliminate lateral or sidewise drag due to an unbalanced force condition which tends to swing the tool bar 10 about the pivot pin 23, or create a sidewise drag on the tractor when the tool bar is rigidly secured to the lift structure, and this sidewise drag increases the power required to plow and makes it difficult to steer the tractor if not impossible to do so. If the unbalanced condition still tends to swing the tool bar in a clockwise direction, Fig. 1, the L-shaped bolts 43 of selected connectors are loosened and the respective plows and plow beams moved forwardly toward the tool bar 10 and the bolts retightened to again clamp the respective plow beams to the connectors. This reduces the moments tending to swing the tool bar 10 in a clockwise direction. If the forces tend to swing the tool bar in a counter clockwise direction, the plows and plow beams are adjusted rearwardly relative to the tool bar 10.

The group of plows may be so adjusted as required until the moments tending to swing the tool bar 10 are equalized, and the gang of plows will then trail in line behind the tractor with no sidewise drag and thereby reducing the power required for the plowing operations and full steering of the tractor.

It is believed obvious that my improved plow connector and arrangement of a gang of plows behind a tractor will materially lessen the power required for the plowing operation and allow any number of plows to be connected either rigidly or pivotally to the lift structure with the proper spacing of the respective plows with any width of tractor wheel spacing.

It is to be understood that while I have illustrated and described a certain form of my invention, it is not to be limited to the specific forms or arrangement of parts herein described and shown except insofar as such limitations are included in the claims.

What I claim and desire to secure by Letters Patent is:

1. In combination, a tractor having a power lift, a draw bar carried by the power lift, a tool bar arranged substantially transversely of the tractor in trailing relation thereto, hitch means connecting the tool bar to the draw bar for lateral swinging movement only relative thereto and for bodily vertical movement therewith, a plurality of plow shares each having lateral forces applied thereto in normal plowing operations, a plow beam rigid on each plow share and extending upwardly and forwardly therefrom, an elongated bracket for each plow share beam, means rigidly and adjustably securing the elongated brackets to the tool bar in substantially equally laterally spaced relation whereby the spacing of the brackets one to the other substantially corresponds to the desired spacing of the plow shares, said plow beams being sleeved in the respective brackets for movement toward and away from the tool bar for adjusting the position of the respective plow share longitudinally relative to the tractor, said plow shares each having different spacing from the tool bar, means rigidly and adjustably securing the respective plow beams to the respective brackets in selected adjusted position whereby the turning moments applied to the tool bar resulting from the forces acting on the plows during plowing operations are substantially equalized and the gang of plows trailed behind the tractor substantially free of sidewise drag.

2. In combination, a tractor having a power lift, a draft bar carried by the power lift, a tool bar arranged substantially transversely of the tractor in trailing relation thereto, hitch means pivotally connecting the tool bar to the draft bar for lateral swinging movement only relative thereto and for bodily vertical movement therewith, a plurality of plow shares to each of which is imparted lateral forces in plowing operations, a plow beam on each plow share and extending upwardly and forwardly therefrom, a connector for each plow beam, each connector comprising an elongated bracket of angular cross section, clamp means at one end of the respective brackets for securing the respective brackets to the tool bar in spaced relation one to the other corresponding substantially to the desired lateral spacing of the plow shares, said brackets extending rearwardly from the tool bar whereby the respective plow beams extend longitudinally of the respective brackets and are movable toward and away from the tool bar for adjusting the respective plow shares longitudinally relative to the tractor, said plow shares each having different spacing from the tool bar, spaced slots in the legs of the angle shaped bracket, L-shaped members engaging the opposite sides of the plow beams from the legs of the bracket and having portions extending through the slots in said legs, and means on said L-shaped means for drawing said L-shaped means into tight engagement with the plow beams to clamp the plow beams against the bracket in selected adjusted position, brace means secured between the plow beams to maintain the spacing thereof whereby the plow shares act as a gang plow and the longitudinal position of the respective plow shares cooperates with the relative spacing between the hitch and the respective connector brackets whereby the turning moments supplied to the tool bar are substantially equalized and the plows trailed behind the tractor with substantially no sidewise drag.

References Cited in the file of this patent

UNITED STATES PATENTS

| | | |
|---|---|---|
| 160,230 | Ralston | Feb. 23, 1875 |
| 539,322 | Willis | May 14, 1895 |
| 1,004,463 | Paul | Sept. 26, 1911 |
| 1,198,516 | Biebinger | Sept. 19, 1916 |
| 1,663,728 | Phelps | Mar. 27, 1928 |
| 2,567,737 | Silver et al. | Sept. 11, 1951 |
| 2,658,438 | Seng | Nov. 10, 1953 |

FOREIGN PATENTS

| | | |
|---|---|---|
| 158,559 | Australia | Aug. 31, 1954 |